United States Patent

[11] 3,583,269

[72] Inventors Yugoro Kobayashi;
 Tsutomu Yamakami, both of Tokyo, Japan
[21] Appl. No. 807,026
[22] Filed Mar. 13, 1969
[45] Patented June 8, 1971
[73] Assignee Kabushiki Kaisha Ricoh
 Tokyo, Japan
[32] Priority Mar. 19, 1968
[33] Japan
[31] 43/17,559

[54] ROTARY CUTTER DEVICE
 5 Claims, 2 Drawing Figs.
[52] U.S. Cl. .................................................. 83/341,
 83/349
[51] Int. Cl. ...................................................... B26d 1/38
[50] Field of Search ........................................... 83/341, 349

[56] References Cited
UNITED STATES PATENTS
3,073,196 1/1963 Marcalus ..................... 83/341
3,080,781 3/1963 Splees ......................... 83/341X
3,264,921 8/1966 Nystrand ..................... 83/349X
FOREIGN PATENTS
87,220 8/1936 Sweden ....................... 83/349

Primary Examiner—William S. Lawson
Attorney—Burgess, Ryan and Hicks

ABSTRACT: A rotary cutter device comprising a rotary cutter blade having a straight edge normal to the direction in which is fed or advanced a paper to be cut off and a stationary cutter blade having a curved edge inclined relative to said first mentioned edge upon a cylindrical surface generated by the rotation of said rotary cutter blade, the peripheral speed of said edge of said rotary cutter blade being maintained same with the speed of advancing the paper. The cutting line remains always at right angle relative to the direction of paper advancement even if the paper feed speed is varied.

PATENTED JUN 8 1971

3,583,269

INVENTORS
YUGORO KOBAYASHI
TSUTOMU YAMAKAMI
BY Burgess, Ryan + Hicks
ATTORNEYS

ROTARY CUTTER DEVICE

BACKGROUND OF THE INVENTION

The present invention relates to a rotary cutter and more particularly to a rotary cutter for use with a photocopying machine for cutting off photocopying paper.

In case of a photocopying machine of the type incorporating therein a rolled photocopying paper for the purpose of speeding up and automation of photocopying operation, it is required to cut off into a predetermined length the beltlike rolled photocopying paper. In this case, under the conventional practice, a guillotine cutter is used so that the paper must be stopped stationarily whenever it is cut off. Consequently, the paper advancement or feed is intermittently effected so that the continuous photocopying operation can not be attained. It might be possible to cut off the paper by the guillotine cutter without stopping the paper, but in this case, the cutter must be advanced or displaced together with the paper at the same speed with the paper advancing or feed speed. When these two speeds are not exactly equal, that is when there exists a relative speed therebetween the paper will not be cut off along a cutting line at right angle relative to the direction of the paper advancement. The papers are thus cut off along the slanting lines. From the standpoint of the mechanism it is very difficult to vary the moving speed of the guillotine cutter in response to the paper feed speed so that so far no attempts have been successful. Therefore, the guillotine type movable cutter may be applied only when the paper is advanced at a constant speed, but will not be applied in a photocopying machine such as diazo-type duplicating machine in which the speed of paper advancement is inevitably varied.

The rotary cutter device has been already employed for cutting beltlike paper, but the peripheral speed of the rotary cutter blade is not equal with the paper feed speed so that the rotary cutter blade is not positioned at right angle relative to the paper feed direction, but at a certain inclined angle. Therefore, the rotational speed of the rotary cutter must remain in a predetermined constant relation with the paper feed speed so that the rotary cutter device of the type described is employed generally only when the paper feed speed is constant.

The primary object of the present invention is therefore to provide a rotary cutter device which ensures always the accurate paper cutting along a cutting line at right angle relative to the paper feed direction regardless of the variation of the paper feed speed and without the necessity of stopping the advancement of the paper to be cut off.

SUMMARY OF THE INVENTION

In brief, the present invention provides a rotary cutter device comprising a rotary cutter blade having a straight edge normal to the direction in which is fed or advanced a paper to be cut off and a stationary cutter blade having a curved edge inclined relative to said first mentioned edge upon a cylindrical surface generated by the rotation of said rotary cutter blade, the peripheral speed of said edge of said rotary cutter blade being maintained the same with the speed of advancing the paper to be cut off. Therefore, regardless the speed of advancing the paper to be cut off, the cutting line remains constantly at a right angle relative to the paper advancing direction.

The above and other objects, features and advantages of the present invention will become more apparent from the following description taken in conjunction with the accompanying drawing.

DESCRIPTION OF THE PREFERRED EMBODIMENT

Figure 1:
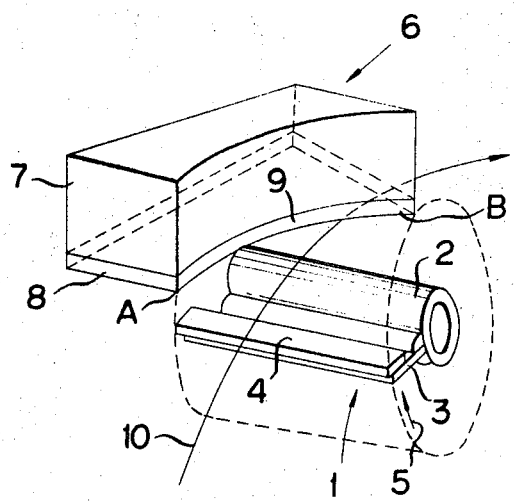
FIG. 1 is a perspective view of one embodiment of a rotary cutter device according to the present invention.

Referring particularly to FIG. 1, a supporting plate 3 is welded to a rotary shaft 2 of a rotary cutter 1 and a rotary cutter blade 4 is fixedly secured upon this supporting plate 3. The rotary shaft 2 is rotated in the direction indicated by the arrow 5 by means of a suitable prime mover means not shown. In this case, the curve traced by the edge of the cutter blade 4 is a cylindrical surface shown by broken lines. The edge of the rotary cutter blade 4 is in parallel with the axis of the cylindrical surface so that the edge of the cutter blade 4 is a straight edge positioned along the generating line of the cylinder.

A stationary cutter blade 8 is fixedly secured to a supporting member 7 of the stationary cutter generally designated in its entirety by 6. The edge 9 of the stationary cutter blade 8 extends over the above described cylindrical surface and forms a curved cutter edge with respect to the straight edge of the rotary cutter blade 4. The paper is fed in the direction indicated by the arrow 10 and the feed velocity is made equal to the peripheral speed of the edge of the rotary blade 4.

The edge of the rotary cutter blade 4 and the edge 9 of the stationary cutter blade 8 are so arranged as to contact with each other when the rotary cutter 1 is rotated. The cutting edge 9 can be relieved by springs 14 and 15 shown in FIG. 2. Alternatively, the edge 9 can be made thinner so as to utilize its elasticity in relieving the edge 9. The edge of the rotary cutter blade 4 contacts first with the edge 9 at point A thereof, and the contact point is being shifted toward point B along the edge 9 as the rotary blade 4 is rotated so that the edge of the rotary blade 4 and the edge 9 of the stationary cutter blade 8 remains always in contact relation with each other. Consequently, the paper fed in the direction indicated by the arrow 10 is successively cut from one side of the paper to the other side at a right angle to the direction of feed of the paper.

As described hereinabove, since the paper is successively cut while the both of the edges of the cutter blades make a point contact, the load applied to the cutter blades in paper cutting can be reduced so that the blades are prevented from being damaged and better cuts are provided in papers. In this case, it is preferable that the cutting angle remains unchanged at the contact points of the edges of the cutter blades so that a uniform cutting load as well as uniform cuts are ensured.

Figure 2:
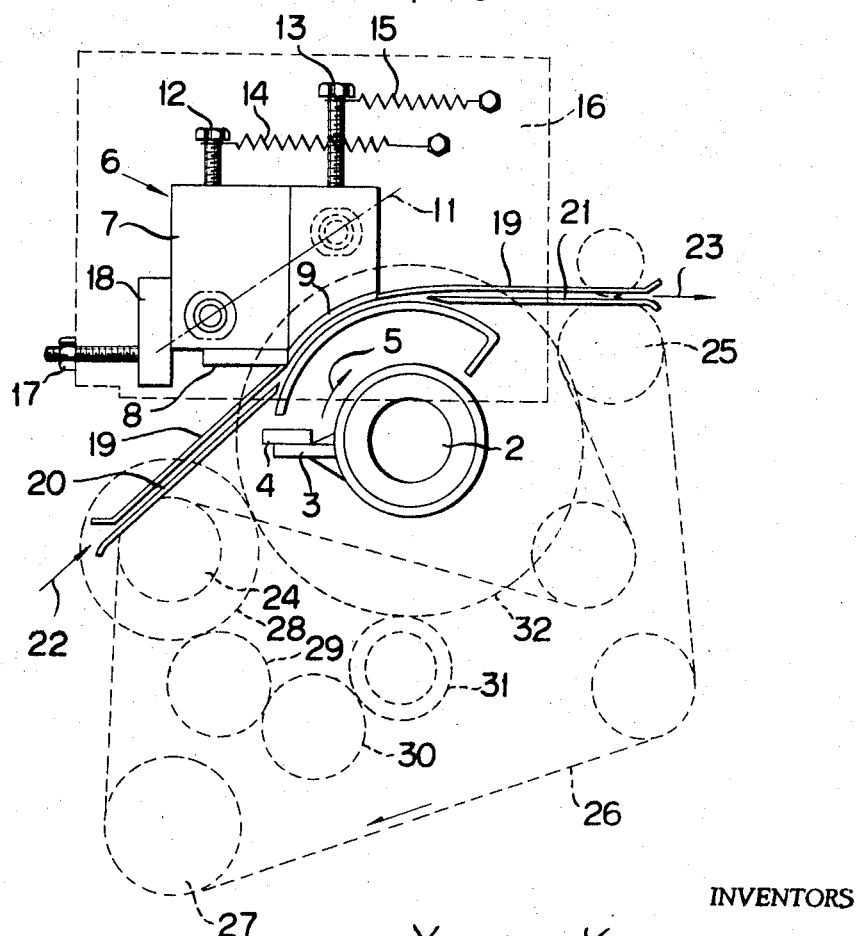
FIG. 2 is a schematic side view thereof incorporated in a photocopying machine.

Referring to FIG. 2, the supporting member 7 of the stationary cutter 6 is pivotably carried on a shaft 11 indicated by a broken line. The supporting member 7 has imparted thereto a torque to cause the supporting member 7 to rotate in the clockwise direction about the shaft 11 by means of bolts 12 and 13 threadably fixed to the supporting member and springs 14 and 15 the ends of which are fixed to the bolts respectively and the other ends of which are fixed to a supporting plate 16 which in turn is fixed to the casing of the photocopying machine. Upon the supporting plate 16 is disposed an adjusting plate 18 which is secured to the supporting member 7 and whose position can be adjusted by an adjusting screw 17. The stationary cutter 6 which has imparted thereto a tendency of rotating in the clockwise direction by the springs 12 and 13 can be adjusted by screw 17 so that the edge 9 of the rotary blade 8 is suitably adjusted. Reference numerals 19, 20 and 21 denote guide plates for photocopying paper which is advanced into this rotary cutter device in the direction indicated by the arrow 22 and is discharged therefrom in the direction indicated by the arrow 23.

Paper feed rollers 24 and 25 are disposed at a position adjacent the guide plates 19 and 20 and at a position adjacent to the guide plates 19 and 21, and are driven through a drive roller 27 through a belt 26. In this case, the rotation of the drive roller 24 is transmitted to the rotary shaft 2 of the rotary cutter 1 through a gear 28 which is disposed coaxial of the drive roller 24 and through a gear train consisting of gears 29, 30, 31 and 32. The above transmission mechanism is so designed that the peripheral speeds of the drive roller 24 and of the edge of the rotary blade 4 become equal. The gear 31 is drivingly coupled with an electromagnetic clutch (not shown) which is controlled by a device (not shown) for measuring the length of photocopying paper.

The rotary cutter blade 4 of the rotary cutter is normally held in a predetermined position when not operated. When the above described paper length measurement instrument is not actuated for measurement of the photocopying paper, the electromagnetic clutch is not actuated so that the rotation of the drive roller 24 is not transmitted to the rotary cutter 1. Upon actuation of the measuring device and consequently the electromagnetic clutch, the rotation of the drive roller 24 is then transmitted to the rotary cutter shaft 2 so that the rotary blade 4 starts to rotate from the above described predetermined initial position, whereby the photocopying paper is cut off at the point of contact between the edge 9 of the stationary blade 8 and the edge of the rotary blade 4.

The peripheral speed of the edge of the rotary blade 4 is equal to the paper feed speed as described hereinabove, and there is no relative speed between the edge of the rotary blade 4 and the paper being fed and cut off during the cutting operation. Furthermore, since the edge of the rotary blade is positioned at a right angle relative to the paper feed direction, the paper is cut off along the straight line at a right angle to the paper feed direction. This is true even if the paper feed speed is varied because in this case the peripheral speed of the edge of the rotary blade 4 is also varied accordingly so that the relative relation between the paper and the edge of the rotary blade remains unchanged. Furthermore because of the equal peripheral speeds of the edge of the rotary blade 4 and the paper feed speed and because the edge of the rotary blade 4 is located always at the same inoperative initial position as described above, the length of the paper to be cut off remains the same regardless of the variation in the paper feed speed.

So far the present invention has been described with particular reference to one embodiment thereof which is applied to the photocopying machine. It is, however, to be understood that the present invention is not limited thereto, but can be advantageously applied to a cutting device for cutting rolled paper into sheet papers, especially a device in which the paper feed speed is inevitably varied.

I claim:
1. A rotary cutter device for cutting a strip of sheetlike material along a cutting line extending perpendicular to the side of said strip, said device comprising
 a continuous rotary cutter blade having an axis of rotation and a rotary blade edge extending parallel to said axis of rotation, said rotary blade edge sweeping out a blade path in the form of a right circular cylinder during rotation of the rotary cutter blade;
 guide means for guiding the strip along a strip path, a cutting segment of said strip path coinciding with a portion of the blade path and being flanked by an approach segment of the strip path along which a strip may approach the cutting segment in a direction perpendicular to the axis of rotation and a recession segment along which a strip may recede from the cutting segment, said guide means comprising a pair of spaced guide plates defining between them the approach segment of the strip path;
 a stationary cutter;
 a continuous stationary cutter edge on the stationary cutter, said stationary cutting edge when in a cutting position coinciding with the cutting segment of the blade path and extending from one side of the strip path to the other, said stationary cutting edge extending at all segments along its length in a direction which is non-parallel to the axis of rotation of the rotary cutter blade;
 and feed means for feeding a strip along the strip path at a speed equal to the peripheral speed of the rotary blade edge during engagement of said rotary blade edge with the strip.

2. The device of claim 1 wherein the convex side of the cutting portion of the strip path is at least partially defined by the stationary cutter and the concave side of the cutting portion of the strip path during the advance of the strip prior to a cutting operation is free of moving support elements.

3. The device of claim 1 comprising support means for supporting the stationary cutter edge for motion away from the cutting position and biasing means for resiliently biasing the cutter edge into the cutting position.

4. The device of claim 3 wherein the support means comprises pivot means about which the stationary cutter can rotate and the biasing means comprises a spring extending between the stationary cutter and a fixed part of the device.

5. A rotary cutter device for cutting a strip of sheetlike material along a cutting line extending perpendicular to the side of said strip, said device comprising
 a rotary cutter blade having an axis of rotation and a rotary blade edge extending parallel to said axis of rotation, said rotary blade edge sweeping out a blade path in the form of a right circular cylinder during rotation of the rotary cutter blade;
 guide means for guiding the strip along a strip path, a cutting segment of said strip path coinciding with a portion of the blade path and being flanked by an approach segment of the strip path along which a strip may approach the cutting segment in a direction perpendicular to the axis of rotation, said approach segment being defined by a pair of spaced guide plates, and a recession segment along which a strip may recede from the cutting segment, the convex side of the cutting portion of the strip path being at least partially defined by a stationary cutter and the concave side of the cutting portion of the strip path during the advance of the strip prior to a cutting operation is free of moving support elements;
 a stationary cutter edge on the stationary cutter, said stationary cutting edge when in a cutting position coinciding with the cutting segment of the blade path and extending from one side of the strip path to the other, said stationary cutting edge extending at all segments along its length in a direction which is nonparallel to the axis of rotation of the rotary cutter blade;
 support means comprising pivot means about which the stationary cutter can rotate for supporting the stationary cutter edge for motion away from the cutting position;
 biasing means comprising a spring extending between the stationary cutter and a fixed part of the device for resiliently biasing the cutter edge into the cutting position; and
 feed means for feeding a strip along the strip path at a speed equal to the peripheral speed of the rotary blade edge during engagement of said rotary blade edge with the strip, said feed means comprising a rotatable drive roller positioned to engage a strip in the approach segment of the strip path and means for synchronizing the rotation of said feed roller with the rotation of the rotary cutter during motion of the rotary cutter blade in the cutting segment of the strip path and thereby producing identical peripheral speeds of the drive roller and the rotary cutter blade.